United States Patent [19]
Anderson et al.

[11] Patent Number: 5,630,391
[45] Date of Patent: May 20, 1997

[54] PISTON WITH PIN BOSS COOLING

[75] Inventors: Werner Anderson, Oberboihingen; Thomas Hoch; Dietmar Wetzel, both of Stuttgart, all of Germany

[73] Assignee: Mahle GmbH, Stuttgart, Germany

[21] Appl. No.: 351,823

[22] Filed: Dec. 8, 1994

[30] Foreign Application Priority Data

Dec. 9, 1993 [DE] Germany .................. 43 43 044.3

[51] Int. Cl.$^6$ .................. F01B 31/10; F02F 3/16
[52] U.S. Cl. .................. 123/196 M; 123/193.6; 92/159
[58] Field of Search .................. 123/196 R, 196 M, 123/193.6, 193.4; 92/158, 159, 153, 157

[56] References Cited

U.S. PATENT DOCUMENTS

| | | |
|---|---|---|
| 1,366,937 | 2/1921 | Reddig . |
| 4,068,563 | 1/1978 | Ryan et al. . |
| 4,506,632 | 3/1985 | Kanda et al. .................. 92/159 |
| 4,696,224 | 9/1987 | Mishima . |
| 4,794,848 | 1/1989 | Melchior .................. 92/159 |
| 4,987,866 | 1/1991 | Mielke et al. .................. 123/193.6 |
| 5,052,280 | 10/1991 | Kopf et al. .................. 92/159 |
| 5,076,149 | 12/1991 | Everts . |
| 5,086,736 | 2/1992 | Wiemann .................. 95/159 |

FOREIGN PATENT DOCUMENTS

| | | |
|---|---|---|
| 1149231 | 12/1957 | France . |
| 904 609 | 2/1954 | Germany . |
| 1029636 | 5/1958 | Germany . |
| 1055879 | 4/1959 | Germany . |
| 1822350 | 11/1960 | Germany . |
| 1981055 | 3/1968 | Germany . |
| 28 31 566 | 2/1979 | Germany . |
| 32 17 352 | 12/1983 | Germany . |
| 35 43 109 | 6/1987 | Germany . |
| 36 00 749 | 7/1987 | Germany . |
| 91 08 696.5 | 10/1991 | Germany . |
| 53-143853 | 12/1978 | Japan . |
| 102228 | 11/1916 | United Kingdom . |

*Primary Examiner*—Erick R. Solis
*Attorney, Agent, or Firm*—Collard & Roe, P.C.

[57] ABSTRACT

A piston for an internal combustion engine, particularly for motor vehicles. An oil-collecting chamber is disposed between the pin bosses above the pin boss bore. Oil collects within the chamber and is directed down onto the pin bosses, during reciprocating motion of the piston. The width of the chamber is approximately the same as the diameter of the pin boss bore.

2 Claims, 2 Drawing Sheets

PISTON WITH PIN BOSS COOLING

BACKGROUND OF THE INVENTION

1. Field of the Invention

The invention relates to a piston for an internal combustion engine. More specifically, it relates to an oil-collecting recess formed in the piston head bottom for directing oil onto the pin bosses.

2. The Prior Art

In highly stressed internal combustion engines for motor vehicles, the piston pin bosses must be adequately lubricated and cooled.

The problem of the present invention is to provide a simply constructed piston where the piston pin bosses are sufficiently lubricated and cooled.

SUMMARY OF THE INVENTION

It is, therefore, an object of the present invention to provide a piston for an internal combustion engine in which the pin bosses are adequately lubricated and cooled.

It is a further object of the present invention to provide such a piston which can be easily manufactured.

These and other related objects are achieved according to the invention by a piston for an internal combustion engine including a ring belt, a skirt, a piston head with a bottom and two pin bosses extending downwardly from the piston head bottom. The two pin bosses have a pin boss bore for receiving a piston pin. The piston includes an oil-collecting chamber disposed between the two pin bosses and above the pin boss bore. The piston head bottom includes an oil collecting recess formed therein. The oil-collecting recess is in communication with the oil-collecting chamber. The oil-collecting chamber and the oil-collecting recess have a common width W. The pin boss bore has a diameter D. The width W is approximately the same length as diameter D. The depth of the oil collecting chamber and the oil collecting recess is generally within the range of 0.2 mm. to 1.5 mm.

Alternatively, the invention relates to a piston adapted for reciprocating motion within an internal combustion engine including a ring belt, a skirt, a piston head with a bottom and two pin bosses extending downwardly from the piston head bottom. The two pin bosses have a pin boss bore for receiving a piston pin. The piston includes a means for lubricating and cooling the pin bosses with lubricating oil. The lubricating and cooling means includes an oil-collecting chamber disposed between the two pin bosses and above the pin boss bore. The lubricating and cooling means further includes an oil-collecting recess formed in the piston head bottom, above the oil-collecting chamber and in communication with the oil-collecting chamber. The oil-collecting recess is configured and dimensioned so that during the reciprocating motion of the piston, lubricating oil will collect within the recess and will be directed onto the pin bosses.

BRIEF DESCRIPTION OF THE DRAWINGS

Other objects and features of the present invention will become apparent from the following detailed description considered in connection with the accompanying drawings which disclose embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
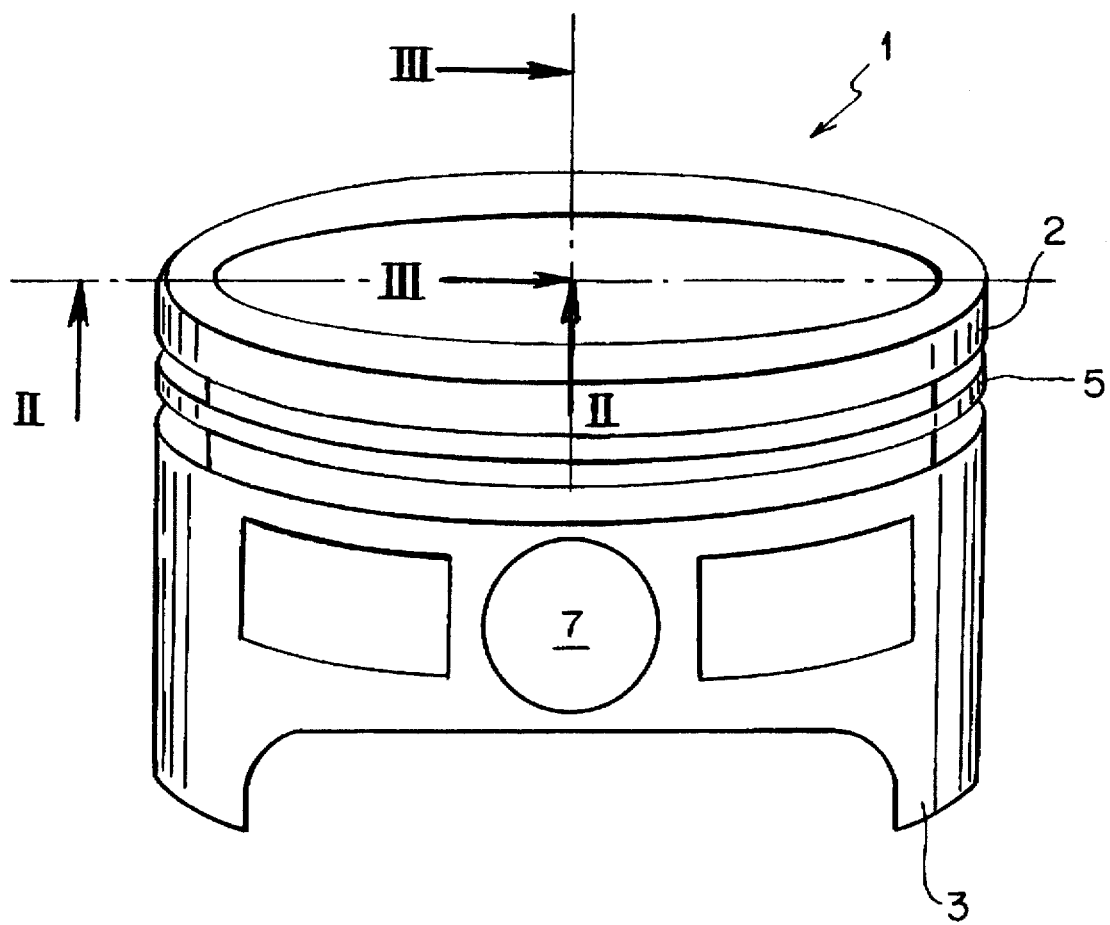
FIG. 1 is a perspective view of a piston according to the invention.
Figure 2:
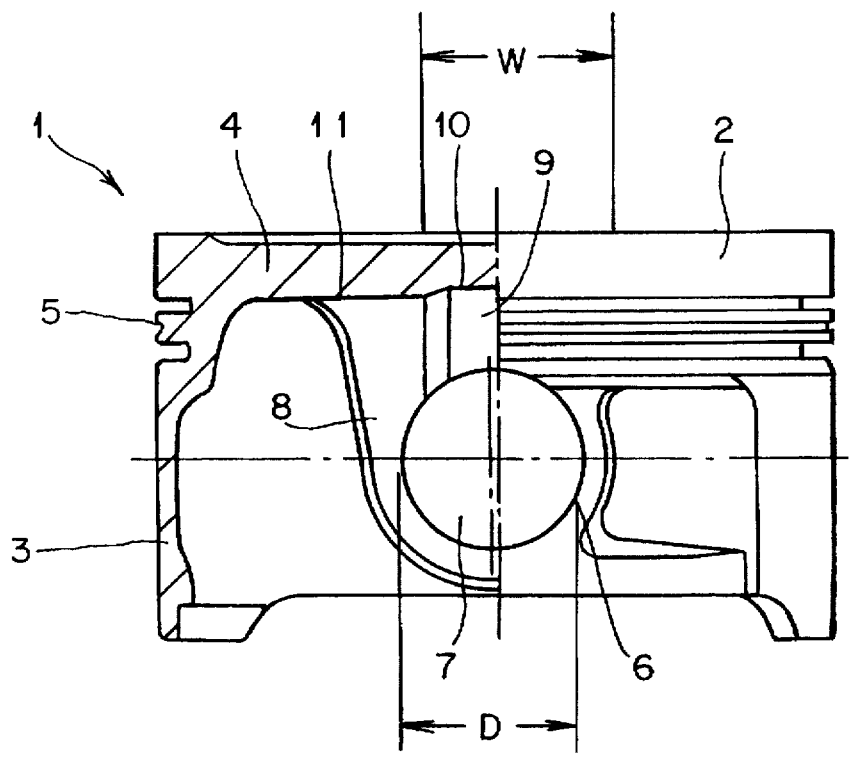
FIG. 2 is a partial cross-sectional view taken along the line II—II from FIG. 1, of the piston.
Figure 3:
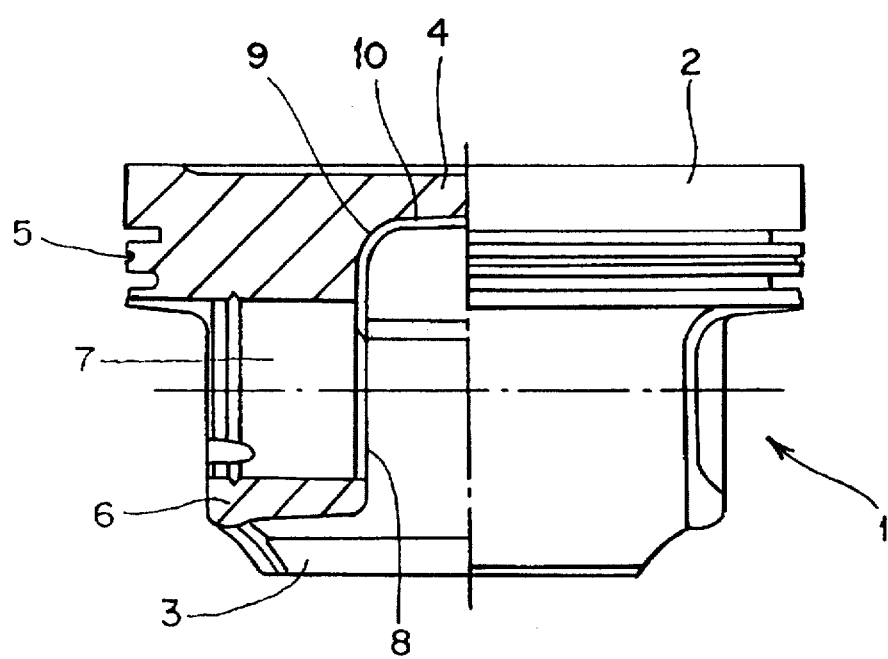
FIG. 3 is a partial cross sectional view taken along the line III—III from FIG. 1, of the piston.

Referring now in detail to the drawings, and in particular FIGS. 1, 2 and 3, there is shown a piston 1 made from a light metal alloy for an internal combustion engine, in particular for a motor vehicle. Piston 1 has a piston head 2 and an integrally-formed piston shaft 3. The piston head 2 has a piston bottom 4 and a ring belt 5. Two piston pin bosses 6 extend downwardly from the piston bottom 4. Bosses 6 have a piston pin boss bore 7 for receiving the piston pin (not shown in the drawing).

Within the zone of the piston pin boss bore 7 and above the latter, provision is made in an area 8 between the piston pin bosses 6 for a chamber 9, which merges into a recess 10 on the inside 11 of the piston bottom 4. The widths of chamber 9 and of recess 10 are the same and approximately correspond with the diameter of the piston pin boss bore 7. The depth or height of chamber 9 and recess 10 is about 0.5 mm. The oil-collecting chamber and the oil-collecting recess have a common width W. The pin boss bore has a diameter D. The width W is approximately the same length as diameter D. The depth of the oil collecting chamber (9) and the oil collecting recess (10) is generally within the range of 0.2 mm. to 1.5 mm.

When the piston 1 is reciprocating within the cylinder, oil preferably collects in recess 10. The oil may be supplied via the connecting rod or other suitable structure. For example, the oil feeds in through the connecting rod and into pin boss bore 7 wherein the oil moves through the boss bore 7 into chamber 9 finally collecting in recess 10. Recess 10 is dome-shaped, for example. The collected oil is directed onto the bosses when the movement of the piston reverses. Therefore, with such a design, a simply constructed piston for an internal combustion engine is provided with excellent cooling and lubricating characteristics of the piston pin bosses.

While only a single embodiment of the present invention has been shown and described, it is to be understood that many changes and modifications may be made thereunto without departing from the spirit and scope of the invention as defined in the appended claims.

What is claimed is:

1. A piston for an internal combustion engine including a ring belt, a skirt, a piston head with a bottom and two pin bosses extending downwardly from said piston head bottom; said pin bosses having a pin boss bore for receiving a piston pin, the piston comprising;

an oil-collecting chamber having a depth and disposed between said two pin bosses and above said pin boss bore;

said piston head bottom including an oil-collecting dome shaped recess formed therein, said oil-collecting recess being in communication with said oil-collecting chamber so that after oil collects in the recess, it is directed into the bosses when the movement of the piston reverses;

wherein said oil-collecting chamber and said oil-collecting recess have a common width W, wherein the pin boss bore has a diameter D, wherein width W is approximately the same length as diameter D; and wherein the depth of said oil collecting chamber and said oil collecting recess is generally within the range of 0.2 mm to 1.5 mm.

2. A piston adapted for reciprocating motion within an internal combustion engine including a ring belt, a skirt, a piston head with a bottom, and two pin bosses extending downwardly from said piston head bottom; said two pin bosses having a pin boss bore for receiving a piston pin, the piston comprising:

means for lubricating and cooling said pin bosses, with lubricating oil including:

(a) an oil-collecting chamber having a depth and disposed between said two pin bosses and above said pin boss bore;

(b) an oil-collecting recess formed in said piston head bottom, above said oil-collecting chamber and in communication with said oil-collecting chamber, said oil collecting recess being dome shaped so that during reciprocating motion of the piston, lubricating oil collects within said recess and is directed onto said pin bosses;

wherein said oil-collecting chamber and said oil-collecting recess have a common width W, wherein the pin boss bore has a diameter D, wherein width W is approximately the same length as diameter D; and wherein the depth of said oil collecting chamber and said oil collecting recess is generally within the range of 0.2 mm to 1.5 mm.

\* \* \* \* \*

UNITED STATES PATENT AND TRADEMARK OFFICE
CERTIFICATE OF CORRECTION

PATENT NO. : 5,630,391
DATED : May 20, 1997
INVENTOR(S) : Anderson et al

It is certified that error appears in the above-indentified patent and that said Letters Patent is hereby corrected as shown below:

In the title page, under [30], please correct "43 43 044.3" to -- 43 42 044.3 --

Signed and Sealed this

Twelfth Day of August, 1997

Attest:

BRUCE LEHMAN

Attesting Officer

Commissioner of Patents and Trademarks